(12) United States Patent
Wilken et al.

(10) Patent No.: US 9,002,594 B2
(45) Date of Patent: Apr. 7, 2015

(54) AGRICULTURAL WORKING MACHINE HAVING AT LEAST ONE CONTROL UNIT

(71) Applicant: CLAAS Selbstfahrende Erntemaschinen GmbH, Harsewinkel (DE)

(72) Inventors: Andreas Wilken, Bissendorf (DE); Sebastian Neu, Bad Laer (DE); Christoph Heitmann, Warendorf (DE); Joachim Baumgarten, Beelen (DE); Christoph Bussmann, Harsewinkel (DE); Henner Voecking, Rietberg (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/942,091

(22) Filed: Jul. 15, 2013

(65) Prior Publication Data
US 2014/0019017 A1    Jan. 16, 2014

(30) Foreign Application Priority Data

Jul. 16, 2012  (DE) .......................... 10 2012 106 390
Jun. 13, 2013  (DE) .......................... 10 2013 106 128

(51) Int. Cl.
*A01D 41/00*    (2006.01)
*A01D 41/127*    (2006.01)
*G05B 11/06*    (2006.01)

(52) U.S. Cl.
CPC .............. *A01D 41/127* (2013.01); *G05B 11/06* (2013.01)

(58) Field of Classification Search
CPC .............. A01D 41/00; A01D 41/127–41/1278
See application file for complete search history.

(56) References Cited

U.S. PATENT DOCUMENTS

| | | | | |
|---|---|---|---|---|
| 4,747,301 A * | 5/1988 | Bellanger | ................... | 73/114.53 |
| 5,666,793 A * | 9/1997 | Bottinger | ................... | 56/10.2 R |
| 6,024,035 A * | 2/2000 | Flamme | ......................... | 111/178 |
| 6,070,538 A * | 6/2000 | Flamme et al. | ............... | 111/170 |
| 6,119,442 A * | 9/2000 | Hale | ........................... | 56/10.2 H |
| 6,167,337 A * | 12/2000 | Haack et al. | ..................... | 701/50 |
| 6,216,071 B1 * | 4/2001 | Motz | ................................ | 701/50 |
| 6,282,476 B1 * | 8/2001 | Hieronymus et al. | ........... | 701/50 |
| 6,834,484 B2 * | 12/2004 | Coers et al. | ................. | 56/10.2 R |
| 7,121,633 B2 * | 10/2006 | Tachiiri et al. | .................. | 303/20 |

(Continued)

FOREIGN PATENT DOCUMENTS

| | | |
|---|---|---|
| DE | 101 47 733 | 4/2003 |
| DE | 10 2006 044 628 | 4/2008 |
| DE | 10 2009 009 767 | 8/2010 |

*Primary Examiner* — Jonathan M Dager
(74) *Attorney, Agent, or Firm* — Michael J. Striker

(57) ABSTRACT

An agricultural working machine has a one control/regulating unit designed to adjust and monitor working parameters, quality parameters or both of the agricultural working machine that influence a harvesting process. The adjusting and monitoring are carried out in an automatable manner by the control/regulating unit using stored families of characteristics. The agricultural working machine also has at least one display device for depicting setpoint values and actual values of the working parameters, quality parameters or both. The control/regulating unit actuates defined measurement points in the stored families of characteristics and the specifically actuated measurement points are located in the boundary regions of the family of characteristics or outside the active working region of the particular family of characteristics.

16 Claims, 3 Drawing Sheets

(56) References Cited

U.S. PATENT DOCUMENTS

| | | | |
|---|---|---|---|
| 7,143,873 B2* | 12/2006 | Pascucci et al. | 188/72.7 |
| 7,266,415 B2* | 9/2007 | Fitzner | 700/17 |
| 7,343,262 B2* | 3/2008 | Baumgarten et al. | 702/129 |
| 7,362,233 B2* | 4/2008 | Behnke et al. | 340/684 |
| 7,415,340 B2* | 8/2008 | Fitzner | 701/50 |
| 7,630,808 B2* | 12/2009 | Behnke et al. | 701/50 |
| 7,670,218 B2* | 3/2010 | Behnke et al. | 460/4 |
| 7,872,587 B2* | 1/2011 | Hindryckx et al. | 340/684 |
| 7,913,482 B2* | 3/2011 | Olander et al. | 56/341 |
| 7,992,691 B2* | 8/2011 | Maron et al. | 188/156 |
| 8,019,517 B2* | 9/2011 | Boenig et al. | 701/50 |
| 8,185,287 B2* | 5/2012 | Maron et al. | 701/70 |
| 8,255,136 B2* | 8/2012 | Bentner et al. | 701/70 |
| 8,296,029 B2* | 10/2012 | Watanabe et al. | 701/70 |
| 8,406,964 B2 | 3/2013 | Baumgarten et al. | |
| 8,428,830 B2* | 4/2013 | Diekhans et al. | 701/50 |
| 8,560,184 B2* | 10/2013 | Seeger | 701/70 |
| 8,645,039 B2* | 2/2014 | Schneider et al. | 701/70 |
| 2001/0033106 A1* | 10/2001 | Shirai et al. | 303/177 |
| 2002/0108508 A1* | 8/2002 | Leupe et al. | 100/45 |
| 2002/0149599 A1* | 10/2002 | Dwyer et al. | 345/592 |
| 2003/0066277 A1* | 4/2003 | Behnke | 56/10.2 R |
| 2003/0216158 A1* | 11/2003 | Bischoff | 460/6 |
| 2003/0217538 A1* | 11/2003 | Pirro | 56/16.4 A |
| 2004/0113486 A1* | 6/2004 | Koga et al. | 303/20 |
| 2005/0004737 A1* | 1/2005 | Fitzner | 701/50 |
| 2005/0137003 A1* | 6/2005 | Behnke et al. | 460/1 |
| 2006/0006735 A1* | 1/2006 | Dupuis | 303/3 |
| 2006/0022926 A1* | 2/2006 | Mizumaki et al. | 345/89 |
| 2006/0069485 A1* | 3/2006 | Diekhans | 701/50 |
| 2006/0123757 A1* | 6/2006 | Baumgarten et al. | 56/10.2 R |
| 2006/0241837 A1* | 10/2006 | Jarrett et al. | 701/50 |
| 2006/0241838 A1* | 10/2006 | Mongiardo et al. | 701/50 |
| 2006/0287792 A1* | 12/2006 | Jarrett | 701/50 |
| 2007/0007817 A1* | 1/2007 | Nonaga et al. | 303/155 |
| 2007/0299566 A1* | 12/2007 | Goss et al. | 701/1 |
| 2008/0071457 A1* | 3/2008 | Shiraki | 701/70 |
| 2008/0086253 A1* | 4/2008 | Nakayama | 701/80 |
| 2008/0269956 A1* | 10/2008 | Dix et al. | 701/1 |
| 2008/0288144 A1* | 11/2008 | Jeppe et al. | 701/50 |
| 2009/0099737 A1* | 4/2009 | Wendte et al. | 701/50 |
| 2009/0099748 A1* | 4/2009 | Watanabe et al. | 701/70 |
| 2009/0126327 A1* | 5/2009 | Bussmann et al. | 56/10.2 A |
| 2009/0133973 A1* | 5/2009 | Shibata | 188/71.3 |
| 2009/0133975 A1* | 5/2009 | Gilles | 188/72.6 |
| 2009/0283371 A1* | 11/2009 | Winkler et al. | 188/72.6 |
| 2010/0072811 A1* | 3/2010 | Kondo et al. | 303/20 |
| 2010/0125788 A1* | 5/2010 | Hieronymus et al. | 715/702 |
| 2010/0206677 A1* | 8/2010 | Shiraki | 188/325 |
| 2010/0217474 A1* | 8/2010 | Baumgarten et al. | 701/29 |
| 2010/0217481 A1* | 8/2010 | Baumgarten et al. | 701/35 |
| 2011/0023440 A1* | 2/2011 | Matousek et al. | 56/341 |
| 2011/0042171 A1* | 2/2011 | Knechtges | 188/106 F |
| 2011/0224880 A1* | 9/2011 | Baehrle-Miller et al. | 701/70 |
| 2011/0278105 A1* | 11/2011 | Maron et al. | 188/72.1 |
| 2012/0004812 A1* | 1/2012 | Baumgarten et al. | 701/50 |
| 2012/0205202 A1* | 8/2012 | Baehrle-Miller et al. | 188/106 P |
| 2012/0229394 A1* | 9/2012 | Ehrl et al. | 345/173 |
| 2013/0001027 A1* | 1/2013 | Baehrle-Miller et al. | 188/106 F |
| 2013/0030660 A1* | 1/2013 | Fujimoto | 701/50 |
| 2013/0056315 A1* | 3/2013 | Bieltz et al. | 188/106 P |
| 2013/0167227 A1* | 6/2013 | Miura et al. | 726/19 |
| 2013/0211684 A1* | 8/2013 | Baehrle-Miller et al. | 701/70 |
| 2013/0226427 A1* | 8/2013 | Baehrle-Miller et al. | 701/70 |
| 2013/0231839 A1* | 9/2013 | Baehrle-Miller et al. | 701/70 |
| 2013/0338896 A1* | 12/2013 | Baehrle-Miller et al. | 701/70 |
| 2014/0019018 A1* | 1/2014 | Baumgarten et al. | 701/50 |
| 2014/0053092 A1* | 2/2014 | Grevinga et al. | 715/769 |
| 2014/0053094 A1* | 2/2014 | Grevinga et al. | 715/771 |

* cited by examiner

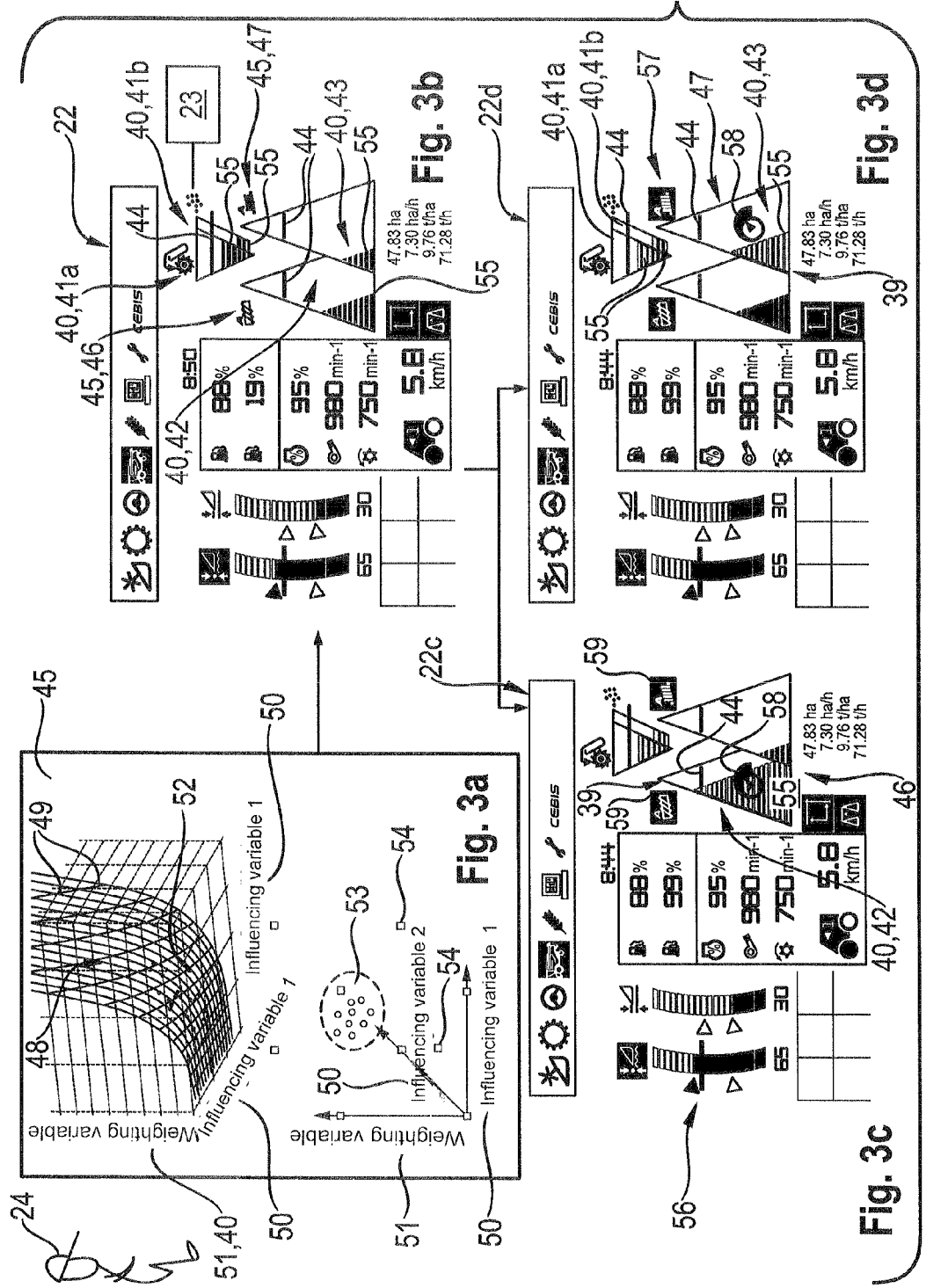

AGRICULTURAL WORKING MACHINE HAVING AT LEAST ONE CONTROL UNIT

CROSS-REFERENCE TO A RELATED APPLICATION

The invention described and claimed hereinbelow is also described in German Patent Application DE 10 2012 106390.0, filed on Jul. 16, 2012, and in German Patent Application DE 10 2013 106128.1, filed on Jun. 13, 2013. The German Patent subject matters of which are incorporated herein by reference, provide the basis for a claim of priority of invention under 35 U.S.C. 119(a)-(d).

BACKGROUND OF THE INVENTION

The invention relates to an agricultural working machine comprising at least one control/regulating unit designed to adjust and monitor working parameters or quality parameters or both of the harvesting machine, which influence a harvesting process, in an automatable manner using stored families of characteristics and at least one display device for depicting setpoint values and actual values of the working parameters, quality parameters or both.

Monitoring and optimizing working and quality parameters of an agricultural working machine using a control/regulating unit is known. Document DE 10 2006 044 628, for example, presents a method for doing so in which a certain number of parameters is constantly optimized in relation to one another. This point-by-point regulation of machine parameters is developed, inter alia, in DE 10 2009 009 767, such that adjustable machine parameters are optimized depending on events. The operator of the agricultural working machine is thereby kept informed at all times about the on-going optimization processes by a display unit.

Such known optimization methods have the disadvantage that the quality of the characteristic curves stored in the control/regulating units are dependent on the currently occupied operating points. If the machine and crop parameters change abruptly here, the control/regulating unit must operate in another region of the stored families of characteristics, whereby it may become necessary for these families of characteristics to first adapt to the new basic conditions, such as crop properties. As a result, when conditions change abruptly, such regulating systems require a certain settling time before optimal operation thereof is restored.

SUMMARY OF THE INVENTION

The present invention overcomes the shortcomings of known arts, such as those mentioned above.

To that end, the present invention provides a control/regulating unit of an agricultural working machine that implements high-quality regulation of the agricultural working machine and signals the currently active operating mode of the control unit to an operator.

In an embodiment, and agricultural working machine is equipped with at least one control/regulating unit that adjusts and monitors working parameters, quality parameters (or both) of the harvesting machine, which parameters influence a harvesting process, in an automatable manner using stored families of characteristics. The machine is further equipped with at least one display device for depicting setpoint values and actual values of the working parameters, the quality parameters or both. The control/regulating unit actuates defined measurement points in the stored families of characteristics and, specifically actuated measurement points are located in the boundary regions of the family of characteristics, outside the active working region of the particular family of characteristics or both. This arrangement ensures that high-quality regulation of the agricultural working machine is made possible and has the effect, in particular, that the stored family of characteristics in the entire stored range of values enables the agricultural working machine to achieve a good working result, even in the presence of greatly fluctuating working conditions.

In order to ensure that the operator of the agricultural working machine also is informed about the currently active operating mode of the control/regulating unit, at least one characteristic symbol that visualizes the automated adjustment and monitoring of a working parameter or a quality parameter (or both) appears at the point in the display of the setpoint value or an actual value (or both), of the working parameter or the quality parameter (or both), upon activation of the specific actuation of a defined measurement point.

In order to ensure that the complexity of calculation and regulation to be performed by the control/regulating unit remains acceptable while also ensuring a good result of the regulation, the invention provides that the number of specifically actuatable measurement points per family of characteristics is limited and, is preferably four. This effect of an efficient parameter regulation is also supported in that the actuatable measurement points are actuated repeatedly in a defined time interval. The duration of the time interval increases as the operating time of the agricultural working machine increases. Preferably, at the beginning of the operating period, the duration of the time interval is less than 15 minutes and increases to 30 minutes as the Operating time increases.

The operator of the agricultural working machine is well informed about the specific actuation of measurement points currently not located in the working field (which is taking place internally in the machine) because the characteristic symbol at least partially hides the display of the working parameter, quality parameter or both, and the working parameter, quality parameter or both that is at least partially hidden is visualized passively and preferably in a faded manner.

According to the invention, the characteristic symbol is hidden when an operator over-rides the automated actuation of a measurement point. In this context, a message can be shown on the display device indicating that the automated adjustment and monitoring of parameters is inactive, thereby ensuring that the operator remains informed that all the resources available for optimizing adjustments are not being utilized at this time.

A complex optimization of the agricultural working machine is achieved when the working parameters include machine parameter settings and crop parameters and when the quality parameters include the parameters "loss due to separation", "loss due to cleaning", "tailings", "volume of tailings" and "portion of grain in the tailings".

The operator of the agricultural working machine also is provided with a quick overview of the state of activation of the available automatic settings when the families of characteristics describing the quality criteria are stored in automatic settings, wherein each automatic setting is visualized in the display unit by means of a pictogram, and the activation of an automatic setting is visualized by emphasizing the particular pictogram, and the deactivation of the particular automatic setting is visualized by hiding the particular pictogram.

In order to ensure that the agricultural working machine always makes optimal use of the resources available for making adjustments, the control/regulating unit can also be automatically activated upon start-up of the working machine.

In order to ensure that the agricultural working machine always makes optimal use of the resources available for making adjustments, the control/regulating unit can be automatically activated upon start-up of the working machine.

BRIEF DESCRIPTION OF THE DRAWINGS

Further features and advantages of the invention will become apparent from the description of embodiments that follows, with reference to the attached figures, wherein:

FIGS. 3a-3d show schematic depictions of the display structure of the control/regulating unit in different operating situations;

FIG. 1 shows an agricultural working machine 1. The machine 1 is designed as a combine harvester 2 and comprises a grain-cutting device 3 in the front region thereof, which is connected in a manner known per se to the feed rake 4 of the combine harvester 2. The crop flow 5 passing through the feed rake 4 is transferred in the upper, rear region of the feed rake 4 to the threshing parts 7 of the combine harvester 2, which are at least partially enclosed on the underside by the concave 6. A guide drum 8 disposed downstream of the threshing parts 7 redirects the crop flow 5 emerging from the threshing parts 7 in the rear region of these threshing parts such that the crop flow is transferred directly to a separating device 10 designed as a separating rotor 9. The crop flow 5 is conveyed in the rotating separating rotor 9 such that any unencumbered grains 11 contained in the crop flow 5 are separated out in the region underneath the separating rotor 9.

Figure 1:
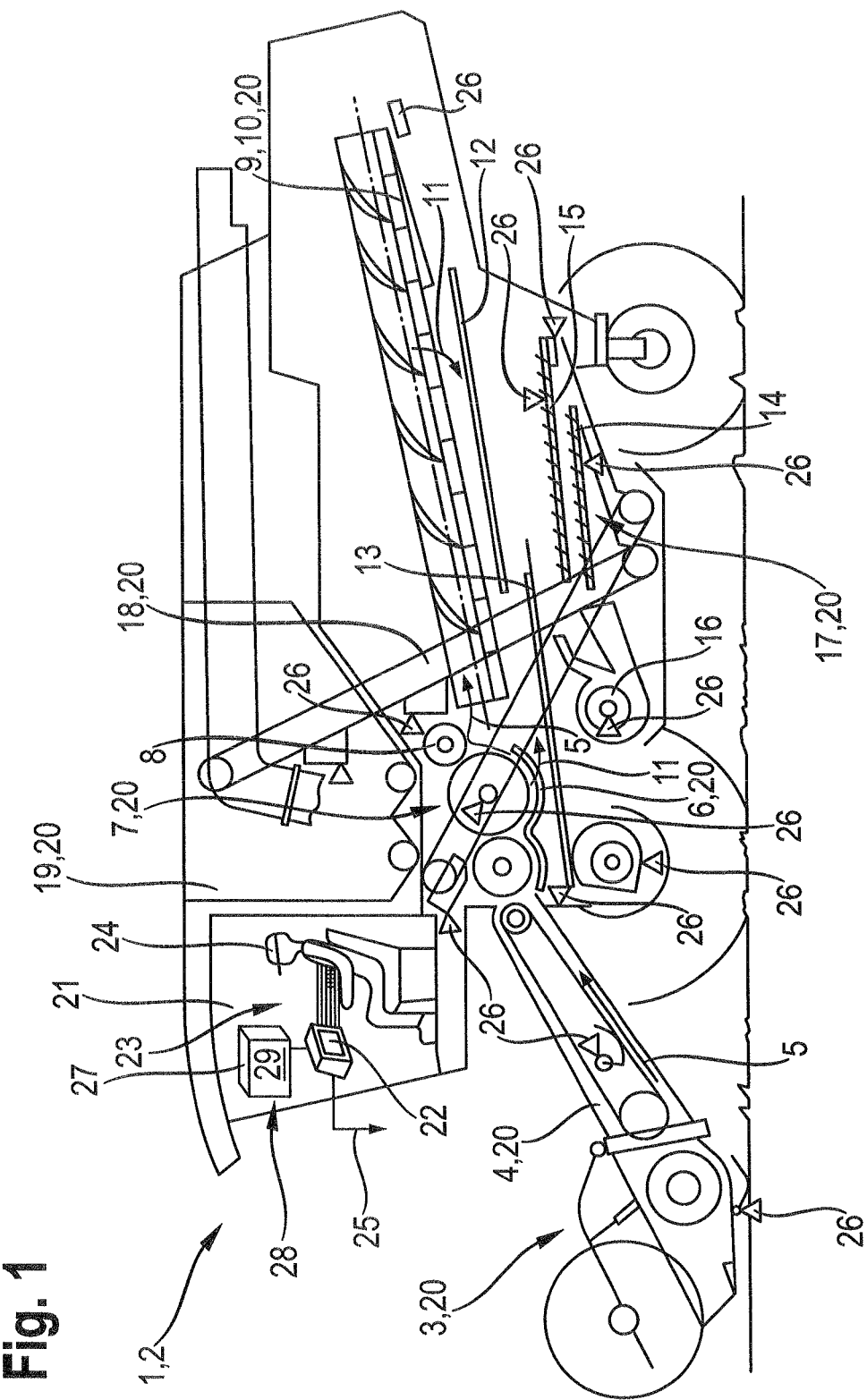
FIG. 1 depicts an agricultural working machine designed as a combine harvester that is configured with a control/regulating unit of the present invention.

The separating device 10, which is designed as a separating rotor 9 in FIG. 1, also to be designed as a tray-type shaker, without deviating from the scope and spirit of the invention. The grains 11 that are separated out at the concave 6 and at the separating rotor 9 are directed via the return pan 12 and the feed pan 13 to a cleaning device 17 (which comprises a plurality of sieve levels 14, 15) and a fan 16. The cleaned flow of grain is then transferred via elevators 18 to a grain tank 19. The grain-cutting device 3, the feed rake 4, the threshing parts 7 and the concave 6 assigned thereto, the separating device 10, the cleaning device 17, the elevators 18, and the grain tank 19 are referred to in the following as the working parts 20 of the agricultural working machine 1.

The agricultural working machine 1 also comprises a driver's cab 21, in which at least one control/regulating unit 23 equipped with a display device 22 is disposed. The control/regulating unit 23 is used to control a plurality of processes, wherein the processes are initiated automatically or by the operator 24 of the agricultural working machine 1. The control/regulating unit 23 communicates via a bus system 25 in a manner known per se with a large number of sensor systems 26. The structure of the sensor systems 26 is described in detail in DE 101 47 733, the entire contents of which are hereby incorporated in the disclosure of this patent application.

In addition, the control/regulating unit 23 is coupled to a driver assistance system 28 comprising a display unit 27. The driver assistance system 28 also can be integrated directly in the control/regulating unit 23. Also, the information 29 provided by the driver assistance system can be visualized directly in the display unit 22 assigned to the control/regulating unit 23.

Figure 2:
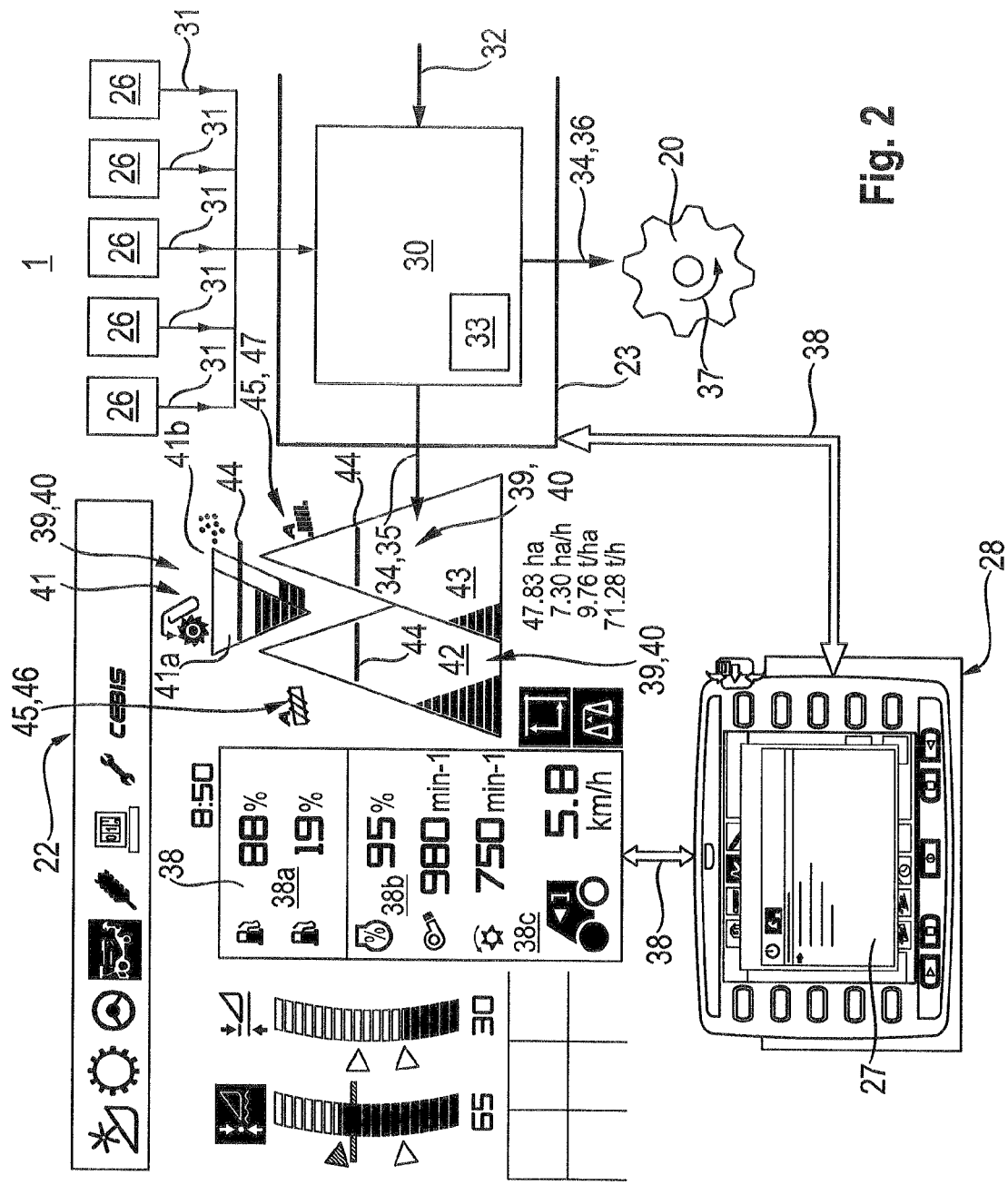
FIG. 2 shows a schematic depiction of a display structure of a control/regulating unit.

FIG. 2 depicts the display unit 22 of the control/regulating unit 23 and the arithmetic logic unit 30, which is assigned to the control/regulating unit 23 and is coupled to the display unit 22. The arithmetic logic unit 30 is designed to process internal information 31 generated by the sensor systems 26, as well as external information 32 and information 33 stored in the arithmetic logic unit 30 itself (such as expert knowledge), in order to generate a plurality of output signals 34. The output signals 34 include, at the least, display control signals 35 and working part signals 36, wherein the former determine the contents of the display unit 22 and the latter initiate the change of the highly diverse working parameters 37 of the working parts 20 of the agricultural working machine 1. Please note that arrow 37 symbolizes the cylinder speed.

In addition, the control/regulating unit 23 is coupled to a driver assistance system 28, as described above. The driver assistance system 28 is integrated in the agricultural working machine 1 such that this agricultural working machine can exchange data 38 with the control/regulating unit 23 and with the display unit 22 assigned thereto. The content of the display units 22, 27 depicted in FIG. 2 is provided as an example, where the invention is not limited to the specific example. The display unit 22 assigned to the control/regulating unit 23 comprises, in the central region thereof, a hotkey window 38. The hotkey window 38 is freely definable by the operator 24. Important machine information such as the fill level of the fuel tank 38a, machine parameter settings 38b, and the ground speed 38c are visualized in the hotkey window 8.

The display unit 22 comprises, in the right-side region thereof, display elements 39 for visualizing current values of certain quality parameters 40 of the agricultural working machine 1. In the embodiment shown, the display element 39 disposed at the top visualizes the "tailings" 41. The depiction on the left visualizes the "volume of tailings" 41a and the depiction on the right visualizes the "portion of grain in the tailings" 41b. The lower, left-hand display element 39 visualizes "losses due to separation" 42, i.e., the grain losses that leave the agricultural working machine 1 in the region thereof via the separating device 10 (which is designed as a separating rotor 9 or a tray-type shaker), and are not conveyed into the grain tank 19.

The lower, right-hand display element 39 visualizes the so-called "losses due to cleaning" 43, wherein the grain losses are displayed here that leave the agricultural working machine 1 via the cleaning device 17 in a manner similar to that of the separating device 10, and are not conveyed into the grain tank 19. Each of the display elements 39 also comprises a setpoint-value display mechanism 44, which is designed as a horizontal line and defines the maximum permissible loss of the particular quality parameter 40 previously defined by the operator 24. The setpoint-value display mechanism 44 permits the operator 24 to quickly recognize whether the quality of work being performed by the agricultural working machine 1 is sufficient.

Due to the complex interrelationships between highly diverse machine parameters 38a-c and at least the quality parameters 40, the possible settings for the separating device 10 and the cleaning device 17 are stored in automatic settings 45. In the embodiment shown (FIG. 2), an automatic separation setting 46 for optimizing the mode of operation of the separating device 10 and an automatic cleaning setting 47 for optimizing the mode of operation of the cleaning device 17 are programmed and stored in the control/regulating device 23. Each of the available automated automatic settings 45 also may be stored in entirety or in part in the driver assistance system 28.

FIGS. 3a-c describe the display unit 22 assigned to the control/regulating device 23 and the available automatic settings 45. FIG. 3a shows a schematic structure of the available automatic settings 45 to better illustrate the mode of operation thereof. The automatic separation setting 46 and the automatic cleaning setting 47 are defined by families of characteristics 48, as is the case for every automatic setting 45 provided for adjusting the working parts 20 of the agricultural working machine 1. The characteristic curves 49 forming a family of characteristics 48 describe various weighting variables 51 of the agricultural working machine 1 as a function of influencing variables 50. In the present case, the weighting variable 51 is the above-described quality parameter 40. In the exemplary embodiment shown, the influencing variables 50 include, at the least, the rotational speed of a separating device 10 designed as a separating rotor 9, the rotational speed of the fan 16 assigned to the cleaning device 17 and the opening width of the sieve levels 14, 15.

During operation of the agricultural working machine 1 (i.e. use of the combine harvester 2 for harvesting in this case), the operating points 52 that are ascertained are added directly to the family of characteristics 48. According to the illustration at the bottom of FIG. 3a, the agricultural working machine 1 often operates only in a small range 53 of the particular family of characteristics 48 that is stored. In order to ensure that the family of characteristics 48 stored in the control/regulating device 23 accurately depicts the particular separating or cleaning process to be modeled in the entire predefined range of values, measurement points 54 that are not located in the currently occupied region 53 of the particular family of characteristics 48 or, are not located in the boundary regions thereof (or both) are actuated at regular intervals. The effect thereof is that the separating or cleaning models stored in the automatic settings 45 also depict the particular process with sufficient accuracy in the boundary region of the families of characteristics 48 and in currently non-occupied regions of the particular family of characteristics 48.

If the agricultural working machine 1 (e.g., the combine harvester 2) is operated with the automatic separation setting 46 activated and the automatic cleaning setting 47 activated, the display unit 22 assigned to the control/regulating unit 23 has the above-described structure shown in FIG. 3b. The value of each quality parameter 40, specifically the "volume of tailings" 41a, the "portion of grain in the tailings" 41b, the "loss due to separation" 42 and the "loss due to cleaning" 43 in this case, is visualized qualitatively in the form of color-enhanced surface areas 55. The expansion of each of the surface areas 55 changes depending on the values for "loss due to separation" 42, "grain loss" 43 and "tailings composition" 41a, 41b ascertained by the control/regulating unit 23. The purpose of the automatic settings 45 is to maintain the quality criteria 40 at an optimal level and below the particular setpoint-value display mechanism 44.

If a defined measurement point 54 must be actuated by the automatic settings 45, two activation states 56, 57 results for the exemplary embodiment described, as shown in FIGS. 3c and 3d. In one activation state 56 (FIG. 3c), the automatic separation setting 46 automatically actuates a measurement point 54, which is located outside of the currently occupied region 53 or in the boundary region of the family of characteristics 48 describing the grain separation at the separating device 10.

In order to ensure that the operator 24 of the agricultural working machine 1 is informed that the automatic separation setting 46 is actuating a measurement point 54 not located in the current working region 53, the surface area 55 visualizing the quality parameter 40 "loss due to separation" 42 in the display unit 22c appears to fade. In addition, it is possible for the size of the fading surface area 55 to be frozen or to continue visualizing the change in the "loss due to separation" 42. The latter variant keeps the operator 24 informed about the course of the change, which can also result in the "loss due to separation" 42 briefly exceeding the mark of the setpoint-value display mechanism 44 before a newly implemented state is reached.

In order to clearly signal to the operator 24 that a measurement point 54 not located in the current working range 53 has been optimized, the display element 39 visualizing the "loss due to separation" 42 is at least partially hidden by a characteristic symbol 58, while the partially hidden working and/or quality parameter 37, 40 is depicted passively, preferably in a fading manner.

Similarly, the structure of the display unit 22 in the further activation state 57 can be adapted as shown in FIG. 3d. In this case, the automatic cleaning setting 47 automatically actuates a measurement point 54 that is located outside the currently occupied region 53 or in the boundary region of the family of characteristics 48 describing the grain separation at the cleaning device 17.

In order to ensure that the operator 24 of the agricultural working machine 1 is informed that the automatic cleaning setting 47 is actuating a measurement point 54 not located in the current working region 53, the surface areas 55 visualizing the quality parameters 40 "loss due to cleaning" 43, "tailings volume" 41a, and "portion of grain in the tailings" 41b in the display unit 22c appear to fade. In addition, it is possible to freeze the size of the fading surface areas 55 or to continue visualizing the change in the "loss due to cleaning" 43, "tailings volume" 41a, and the "portion of grain in the tailings" 41b. The latter variant keeps the operator 24 informed about the course of the changes, which can also result in the "loss due to cleaning" 43, the "tailings volume" 41a and the "portion of grain in the tailings" 41b briefly exceeding the mark of the respective setpoint-value display mechanism 44.

In order to clearly signal to the operator 24 that a measurement point 54 not located in the current working range 53 has been optimized, the invention provides that at least the display element 39 visualizing the "loss due to cleaning" 43 is at least partially hidden by a characteristic symbol 58, while the partially hidden working or quality parameter 37, 40 (or both) is/are depicted passively, preferably in a fading manner.

Each of the available automatic settings 45 can be activated and deactivated independently of one another automatically or triggered by the operator 24, thereby making it possible to select any number of the simultaneously operating automatic settings 45. Preferably, all the automatic settings 45 are always activated in order to optimize the mode of operation of the agricultural working machine 1. Also, the invention provides for an automatic setting 45 to be intentionally shut off, in that the operator 24 enters a defined value in order to deliberately change a working parameter 37. If the operator 24 implements the over-ride during the specific actuation of measurement points 54, the characteristic symbols 58 are hidden and the depiction of the working and/or quality parameters 37, 40 (which may be fading), is eliminated. In this context it is possible for the operator 24 to be explicitly notified via the display unit 22 when automatic settings 45 are deactivated.

The control/regulating unit 23 always visualizes the change of the quality parameters 40 independently of whether automatic settings 45 are activated or not. Accordingly, the pictograms 59 representing the automatic settings 45 are positioned in the display unit 22 and are visualized in an at least color-enhanced manner when the automatic setting 45 is active. Similarly, the deactivation of the particular automatic setting 45 is visualized by hiding the particular pictogram 59.

Also, each automatic setting 45 comprises a separate family of characteristics 48, wherein individual automatic settings 45 can also induce an optimization of the mode of operation of the agricultural working machine 1 via incorporation of several families of characteristics 48. In the exemplary embodiment shown, the automatic cleaning setting 47 considers the families of characteristics 48, which take into account the "loss due to cleaning" 43, the "tailings volume" 41a and the "portion of grain in the tailings" 41b.

In order to ensure that the families of characteristics 48 taken into account deliver useful values for the weighting variables 51 and, therefore for an optimal mode of operation of the agricultural working machine 1 even when the influencing variables 50 fluctuate, measurement points 54 not located in the current working region 53 or in the boundary regions of the families of characteristics 48 are actuated in defined time intervals and, the number of measurement points 54 is limited.

Preferably, the number of specifically actuatable measurement points 54 is limited to four. The defined time intervals (within which the various measurement points 54 are repeatedly actuated), are designed such that the duration of the time interval increases as the operating time of the agricultural working machine 1 increases and, at the beginning of the operating period, is less than 15 minutes and increases to 30 minutes as the operating time increases. The control/regulating mechanism 23 and, therefore, the automatic settings 45 also are automatically activated upon start-up of the agricultural working machine 1. In this context it is provided that, when the automatic settings 45 are inactive, a notice to the operator 24 is generated stating that efficiency can be increased by activating the particular automatic setting 45.

LIST OF REFERENCE CHARACTERS 1 agricultural working machine
2 combine harvester
3 grain-cutting device
4 feed rake
5 crop flow
6 concave
7 threshing part
8 guide drum
9 separating rotor
10 separating device
11 grain
12 return pan
13 feed pan
14 sieve level
15 sieve level
16 fan
17 cleaning device
18 elevator
19 grain tank
20 working part
21 driver's cab
22 display unit
23 control/regulating unit
24 operator
25 bus system
26 sensor system
27 display unit
28 driver assistance system
29 information
30 arithmetic logic unit
31 internal information
32 external information
33 information
34 output signal
35 display signal
36 working part signal
37 working parameter
38 hotkey window
39 display element
40 quality parameter
41 tailings
41a volume of tailings
41b portion of grain in the tailings
42 loss due to separation
43 loss due to cleaning
44 setpoint-value display mechanism
45 automatic setting
46 automatic separation setting
47 automatic cleaning setting
48 family of characteristics
49 characteristic curve
50 influencing variable
51 weighting variable
52 operating point
53 region
54 measurement point
55 surface area
56 controlled condition
57 controlled condition
58 characteristic symbol
59 pictogram As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working machine, comprising
a separating device for separating unencumbered grains from harvested crop;
a cleaning device for cleaning the separated grains;
at least one control/regulating unit for monitoring and adjusting working parameters, quality parameters or both of the agricultural working machine that influence a harvesting process, in an automatable manner using stored families of characteristics that comprise predefined ranges of values in a form of operating points that model a particular separating or cleaning process, wherein the operating points define optional automatic separation settings and optional automatic cleaning settings for optimizing modes operation of the separating device and the cleaning device; and
at least one display device for depicting setpoint values and actual values of the working parameters, the quality parameters or both; and
wherein the control/regulating unit (23), at regular time intervals, actuates defined measurement points (54) in the stored families of characteristics located in boundary regions of the families of characteristics (48) or outside an active working region (52, 53) of a family of the stored families of characteristics (48) or both in order that the separating or cleaning models accurately represent the respective separating or cleaning processes in the boundary regions and in currently non-active working regions of the family a display device depiction.

2. The agricultural working machine according to claim 1, wherein at least one characteristic symbol (58) that visualizes the automated monitoring and adjusting monitoring of a working parameter (37), quality parameter (40) or both appears at the point in the display of the setpoint value, actual value or both of this working parameter or quality parameter (37, 40) upon activation of the specific actuation of a defined measurement point (54).

3. The agricultural working machine according to claim 2, wherein the number of specifically actuatable measurement points (54) per family of characteristics (48) is limited.

4. The agricultural working machine according to claim 3, wherein the number of specifically actuatable measurement points (54) per family of characteristics (48) is four (4).

5. The agricultural working machine according to claim 2, wherein the actuatable measurement points (54) are actuated repeatedly in a defined time interval and wherein the duration of the time interval increases as the operating time of the agricultural working machine (1) increases.

6. The agricultural working machine according to claim 5, wherein at the beginning of the operating period, the time interval is less than 15 minutes and increases to 30 minutes as the operating time increases.

7. The agricultural working machine according to claim 2, wherein the characteristic symbol (58) at least partially hides the display of the working parameter (37), the quality parameter (40) or both and wherein the working parameter (37), the quality parameter (40) or both that is at least partially hidden is visualized in a fading manner.

8. The agricultural working machine according to claim 2, wherein the characteristic symbol (58) at least partially hides the display of the working parameter (37), the quality parameter (40) or both and wherein the working parameter (37), the quality parameter (40) or both that is at least partially hidden is visualized in a faded manner.

9. The agricultural working machine according to claim 7, wherein the characteristic symbol (58) is hidden when an operator (24) over-rides the automated actuation of a measurement point (54).

10. The agricultural working machine according to claim 9, wherein a message can be shown on the display device (22) indicating that the automated adjustment and monitoring of parameters (37, 40) is inactive.

11. The agricultural working machine according to claim 1, wherein the working parameters (37) can include machine parameter settings (38b) and crop parameters.

12. The agricultural working machine according claim 1, wherein the quality parameters (40) include the parameters "loss due to separation" (42), "loss due to cleaning" (43), "tailings" (41), "volume of tailings" (41a), and "portion of grain in the tailings" (41b).

13. The agricultural working machine according to claim 1, wherein the families of characteristics (48) describing the quality parameters (40) are stored in automatic settings (45), wherein each automatic setting (45) is visualized in the display unit (22) by means of a pictogram (59), wherein activation of an automatic setting (45) is visualized by emphasizing the particular pictogram (59) and wherein the deactivation of the particular automatic setting (45) is visualized by hiding the particular pictogram (59).

14. The agricultural working machine according to claim 1, wherein the control/regulating unit (23) is automatically activated upon start-up of the working machine (1).

15. An agricultural working machine, comprising:
at least one control/regulating unit for monitoring and adjusting working parameters, quality parameters or both of the harvesting machine that influence a harvesting process, in an automatable manner using stored families of characteristics; and
at least one display device for depicting setpoint values and actual values of the working parameters, the quality parameters or both;
wherein the control/regulating unit (23) actuates defined measurement points (54) in the stored families of characteristics that are located in the boundary regions of the families of characteristics (48) or outside the active working region (52, 53) of a particular family of characteristics (48) or both;
wherein at least one characteristic symbol (58) that visualizes the automated monitoring and adjusting monitoring of a working parameter (37), quality parameter (40) or both appears at the point in the display of the setpoint value, actual value or both of this working parameter or quality parameter (37, 40) upon activation of the specific actuation of a defined measurement point (54); and
wherein the characteristic symbol (58) at least partially hides the display of the working parameter (37), the quality parameter (40) or both and wherein the working parameter (37), the quality parameter (40) or both that is at least partially hidden is visualized in a faded manner.

16. An agricultural working machine, comprising:
at least one control/regulating unit for monitoring and adjusting working parameters, quality parameters or both of the harvesting machine that influence a harvesting process, in an automatable manner using stored families of characteristics; and
at least one display device for depicting setpoint values and actual values of the working parameters, the quality parameters or both;
wherein the control/regulating unit (23) actuates defined measurement points (54) in the stored families of characteristics that are located in the boundary regions of the families of characteristics (48) or outside the active working region (52, 53) of a particular family of characteristics (48) or both;
wherein at least one characteristic symbol (58) that visualizes the automated monitoring and adjusting monitoring of a working parameter (37), quality parameter (40) or both appears at the point in the display of the setpoint value, actual value or both of this working parameter or quality parameter (37, 40) upon activation of the specific actuation of a defined measurement point (54);
wherein the actuatable measurement points (54) are actuated repeatedly in a defined time interval and wherein the duration of the time interval increases as the operating time of the agricultural working machine (1) increases; and
wherein at the beginning of the operating period, the time interval is less than 15 minutes and increases to 30 minutes as the operating time increases.

* * * * *